United States Patent [19]

Fields

[11] 3,954,366
[45] May 4, 1976

[54] TWO-STAGE SINGLE SCREW EXTRUSION APPARATUS

[76] Inventor: Reuben T. Fields, 726 F. Peachtree Road, Claymont, Del. 19703

[22] Filed: Jan. 6, 1975

[21] Appl. No.: 538,755

[52] U.S. Cl. ............................. 425/208; 425/209; 425/378 R
[51] Int. Cl.² ............................................. B29F 3/02
[58] Field of Search........ 425/208, 207, 209, 378 R; 259/191, 192, 9, 10, 25, 26, 45, 46

[56] References Cited
UNITED STATES PATENTS

| | | | |
|---|---|---|---|
| 3,035,306 | 5/1962 | Rossiter | 425/208 X |
| 3,559,240 | 2/1971 | Kosinsky | 425/208 |
| 3,632,255 | 1/1972 | Geyer | 425/208 X |
| 3,826,477 | 7/1974 | Kunogi | 425/208 X |
| 3,867,079 | 2/1975 | Kim | 425/208 |

Primary Examiner—Richard B. Lazarus

[57] ABSTRACT

A two-stage single screw apparatus and process for the extrusion of plastic resins, the first stage positively advancing the resinous material while in a highly viscous state with minimum blow-back and the second stage, through the use of a screw having multiple lead threads with a high pitch adapted to allow substantial blow-back to provide mixing and ultimate discharge of the resin through die means, providing precise metering and discharge of the molten resin through the die over a wide variation of die pressures.

9 Claims, 3 Drawing Figures

U.S. Patent  May 4, 1976  3,954,366
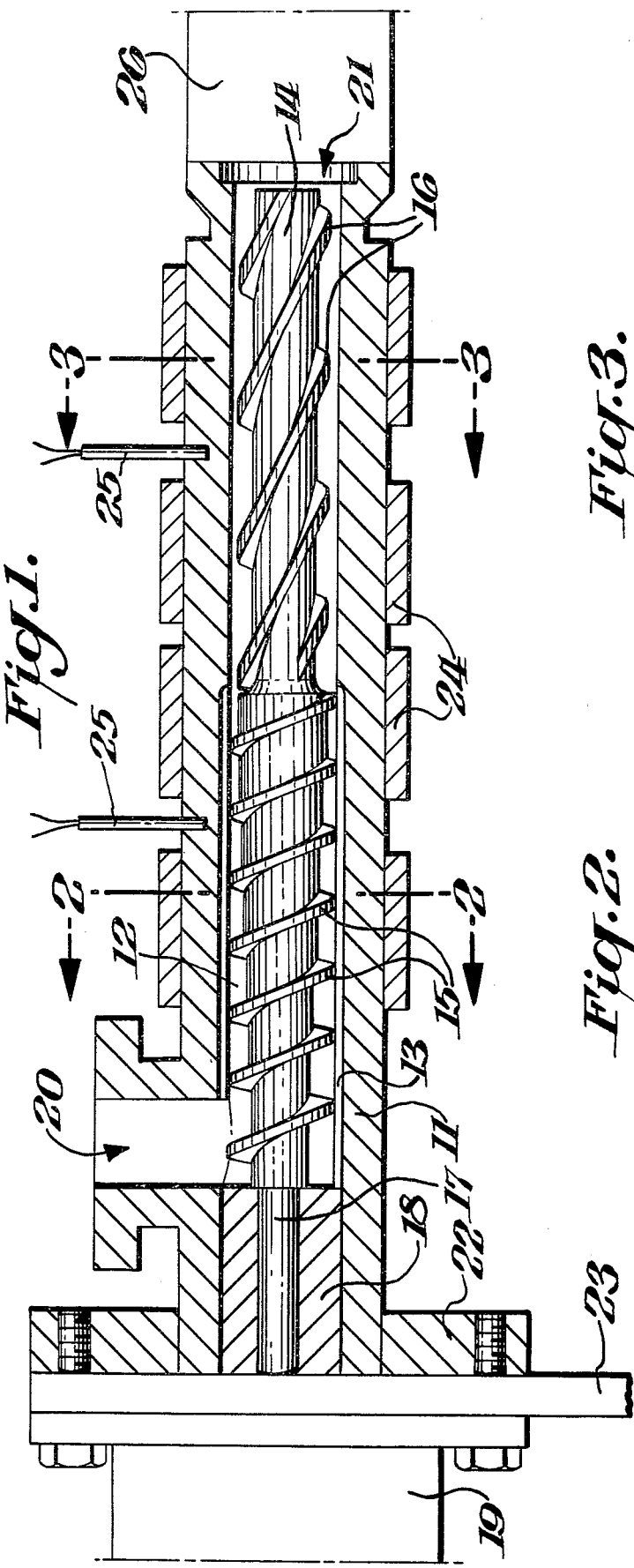
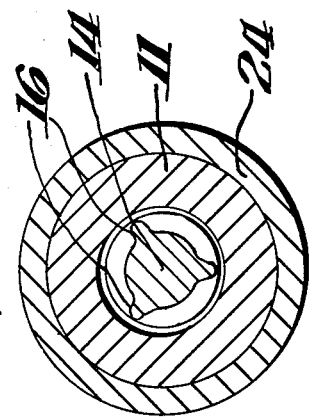
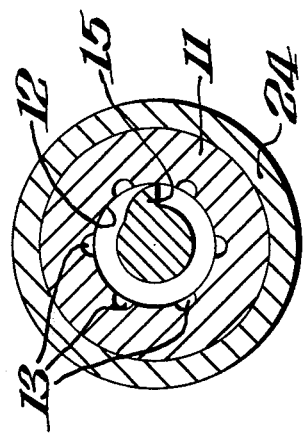

TWO-STAGE SINGLE SCREW EXTRUSION APPARATUS

FIELD OF THE INVENTION

This invention relates to an apparatus and process for the extrusion of plastic resins while providing precise metering over a wide range of discharge die pressures.

BACKGROUND OF THE INVENTION

The apparatus and process of this invention for the extrusion of plastic materials is designed to melt plastic resin particles fed to the extruder and move the material forward along the barrel at a uniform rate and deliver soft, molten, or partially-molten resin through a die of the size and shape required to produce a desired article. Heretofore, it has been difficult to design an extrusion apparatus which will process several kinds of resins in a predictable way since the processing characteristic properties of resins greatly vary in hardness, melt viscosity, frictional properties, latent heat of fusion, thermal stability and fusion temperature. In most conventional extrusion apparatus the apparatus has a feed port near one end of the barrel and an exit port at the opposite end of the barrel. The barrel is usually of constant diameter and lined with a hard, non-corrodable alloy coating. Inside the barrel is a rotatable screw, driven at the end adjacent to the entrance port of the barrel, said screw having a close fit to the inner surface of the barrel, substantially the same length as the barrel, and having one or more threads cut into the surface of the screw, said thread being deep at the entrance end of the screw and for the major part of its length, this leading into a short section of decreasing thread depth, and a longer section of constant, shallow depth. These portions of the extruder are normally called the melting, compressing, and metering sections of the extruder, respectively. A different type of extruder is described in U.S. Pat. No. 3,325,865 which issued June 20, 1967 to G. B. Dunnington et al. In this extruder, the solid particles of resin enter the extruder where they are first compressed to a solid condition, moved forward by relentless mechanical means, melted under pressure, and the molten resin delivered through an exit port in the barrel to a conventional extrusion die to form the desired product.

It has been found that the use of conventional forms of plastic resins (usually relatively coarse granules) makes it necessary to use quite large threads on both the screw and the barrel, this in turn resulting in high capacity per revolution so that the screw turns quite slowly for normal rates of production. Since the melting portion of the extruder of U.S. Pat. No. 3,325,865 does a large part of its melting as mechanical working, the melting portion must travel at much higher rates of revolution relative to the feed screw. This makes necessary a separate drive system for all but very low rates of extrusion, and nearly doubles the cost of the extruder. The present invention is an improvement of the extruder described in U.S. Pat. No. 3,325,865 and is designed to lower the cost of manufacture, increase the useful speed range of a single-drive unit, and to obtain performance superior to that of a conventional extruder.

This invention provides an apparatus and process for the extrusion at a substantial rate, of the group of resins having a high melt viscosity, a low surface friction against metal, or a poor thermal stability, with the extruder being able to operate against fairly high die pressure. This invention also provides improved performance from a single screw extruder by changing the configuration of both the extruder barrel and the screw.

In a single-screw extruder there is only one moving part, the screw, which rotates within the cylindrical barrel. When a resinous plastic material is introduced to the space between the barrel and the screw, it is advanced or carried forward by the rotation of the screw. The forward movement of the resin is controlled primarily by the adhesion or friction of the resin to the screw and the barrel. If the resin adheres well to the barrel, it is advanced forward as the screw rotates. If the resin adheres to the screw and does not adhere to the barrel, the resin rotates with the screw and does not advance along the barrel. The adhesion or non-adhesion of resin to the screw and to the barrel can vary considerably over the wide range of resins in commercial use.

The objective of the present invention is to develop uniform forward movement of the resin before the resin has melted to any appreciable extent, and to transport this resin through suitable channels where it is fully melted and mixed by suitable mechanical agitation before passing out of the extruder through a forming die. Longitudinal grooves cut into the inner surface of the barrel prevent rotation of the resin and gives positive forward movement to the resin as the screw rotates. If the temperature of this end of the barrel is held at approximately the melting point of the resin a very thin layer of melt forms against the barrel wall, thus lubricating the resin for forward movement. Similarly, the frictional slippage of the resin against the screw raises its temperature to the melting point of the resin, thus providing lubrication between the screw and the resin. If the resinous material is not fully melted in this section of the screw, its viscosity is extremely high, thus enabling the extruder to develop high pressures to force the material forward. Also, this high viscosity reduces "back-flow" of resin due to pressure, since the amount of back-flow is inversely proportional to the viscosity of the resinous material. For this reason, the extruder of this invention produces a steady output even though the exit pressure varies over a wide range. This is quite different from a conventional extruder whose output drops rapidly with increase in exit pressure. In the conventional extruder, for comparison, the resin is fully melted and of relatively low viscosity when it reaches the steps of "compression" and "metering" so that the output is much more affected by changes in exit pressures.

These and other objects and provisions are provided by the apparatus and process that are defined more fully in detail below.

The apparatus of this invention is defined as an extrusion apparatus for extruding plastic resinous material comprising:

a. a tubular barrel member having a feed port near one end and a discharge port at the opposite end, said barrel member having an interior surface extending substantially throughout the length of the barrel between the feed port and the discharge port to define a bore therebetween, said bore being comprised of a first entrance high viscosity zone and a second lower viscosity mixing discharge zone, said first zone having longitudinal grooves along the interior surface;

b. a two-zoned screw member rotatably mounted within the bore of said barrel, said screw member having an effective length substantially equal to that of the bore of the barrel member and having a predetermined thread, hand, land, pitch, and diameter for each of said first entrance zone of the bore and the second discharge zone of the bore; the first zone of the screw has a close fit with the interior surface of the bore of the barrel member, the thread of the screw is adapted to provide a compression ratio within the range of about 2 to 3.5 and the pitch of the thread is less than the diameter of the screw; the second zone of the screw has a diameter that is substantially less than the diameter of the bore of the barrel, the screw in said second zone has a multiple lead thread with a pitch at least two times the diameter of the bore;

c. rotating means operatively associated with the screw member for rotating the screw member;

d. heating means operatively associated with the barrel member to maintain temperature of the resinous material within the bore at predetermined temperatures; and e. an extrusion die operatively associated with the discharge port of the tubular barrel member.

It is preferred that the first zone of the bore has a length of ⅜ to ⅝ of the total length of the bore. It is also preferred that the longitudinal grooves in the interior surface of the first zone of the bore have a crescent shaped cross-section. It is preferable that the crescent shaped longitudinal grooves have a depth of less than about 0.2 inches.

Preferably, the first zone of the bore is co-extensive with the first zone of the screw member and the second zone of the bore is co-extensive with the second zone of the screw member. It is most preferred that the pitch of the lead thread within the first zone of the screw is within the range of 0.5 to 1.0 times the diameter of the first zone of the bore.

It is most preferred that the second zone of the screw member has a triple lead thread with a pitch at least two times that of the first zone of the screw and that the thread of the screw within the second zone has a diameter that is within the range of 0.050 inches to 0.100 inches less than the diameter of the second zone of the bore to provide for substantial blow-back and thorough mixing of the molten resin material prior to discharge.

The process of this invention is defined as a process for extruding plastic resinous material comprising:

a. feeding the material into a first zone of a bore of an extruder having a first zone screw member having threads operatively associated therewith;

b. maintaining said resinous material at a temperature near the melting point of the material to provide a highly viscous material and minimize blow-back within the first zone;

c. advancing said resinous material forward through the bore by subjecting the material to a compression ratio within the range of about 2 to 3.5;

d. advancing the material while raising the temperature of the material substantially above its melting point to provide a lowered viscosity into a second zone of the bore and mixing said resinous material within the second zone by means of a corresponding second screw zone having multiple threads having greater pitch than the threads of the first zone and adapted to provide substantial blow-back within said second zone; and then e. guiding the mixed molten resin material through an extrusion die, said process providing precise metering of material over wide pressure ranges at the die.

BRIEF DESCRIPTION OF THE DRAWINGS

This invention will be more fully understood by reference to the following description illustrated by the accompanying drawings in which FIG. 1 is a longitudinal cross-sectional view of the extruder. FIG. 2 is a cross-sectional view of the barrel and screw along the line 2—2 of FIG. 1. FIG. 3 is a cross-sectional view of the barrel and screw along the line 3—3 of FIG. 1.

DETAILED DESCRIPTION OF THE INVENTION

As may be seen from the drawings, the apparatus comprises a barrel or housing 11 having a bore 12 with internal grooves 13 that is fitted with screw 14. The screw 14 is shown with a single lead, right hand thread 15 at the entrance end of barrel 11 and a multiple lead right hand thread 16 at the exit end of the barrel 11. The single lead thread 15 is close-fitting to the barrel bore 12, but the multiple lead thread 16 has substantial clearance to the barrel bore 12. The screw is also shown with a shaft extention 17 which extends through a support bushing 18 and connects to a source of rotational power 19. The barrel 11 has a feed port opening 20 and an outlet end 21 to which an extrusion die 26 is attached. The barrel 11 supports the bushing 18, has a flange 22 for mounting the barrel on a suitable support 23 and to the power source 19. The barrel 11 is fitted with suitable heater bands 24, controlled by thermocouples 25 and a source of electric power, not shown.

The apparatus shown in the drawings is a preferred structure of this invention; however, it is not necessary that the screw be divided evenly, since some polymers are more easily melted than others, and more zones of heating control can be provided as required.

The following examples illustrate the improved performance obtained by this invention.

Example I

An extruder barrel 36 inches long was made with the section adjacent to the feed opening 17 inches long with a diameter of 1.940 inches and having 13 longitudinal grooves cut into the interior surface for the full 17 inch length, the grooves being cut with a ball cutter of 0.250 inch diameter and cut to a depth of approximately 0.080 inch. The remaining 19 inches of barrel was 2.050 inches in diameter with a smooth interior surface. The corresponding sections of the screw were made with a diameter of 1.935 inches, a right-hand single lead thread having a land width of 0.250 inch and a pitch of 1.500 inches, the depth of the thread being 0.332 inch for two turns adjacent to the feed port, the thread depth decreasing uniformly for 6 turns to a thread depth of 0.120 inch and continuing at the 0.120 inch depth for approximately 3⅓ turns to complete the 17 inch section. The screw corresponding to the 19 inch smooth barrel section was made 2.000 inches in diameter with a rounded thread of triple start, right hand, 4½ inches lead cut to a depth of 0.230 inches. The extruder was equipped with the conventional heaters, temperature control devices, drive mechanism, etc. which form no part of the present invention and are not described in detail. Polytetrafluoroethylene - hexafluoropropylene copolymer producible by the process disclosed in U.S. Pat. No. 2,946,763, issued July 26, 1960 to Bro. et al. having a specific melt viscosity of 1

× $10^4$ was processed through the extruder with the results shown in Table 1.

TABLE 1

| Temp. of 1.940 in. dia. barrel | Temp. of 2.050 in. dia. barrel | Die Temp. °F. | Melt Temp. °F. | RPM of Screw | Pressure at die lb/sq. in. | Grams/revolution of screw |
|---|---|---|---|---|---|---|
| 500°F. | 600°F. | 600°F. | 600°F. | 7 | 650 | 33 |
| 500 | 600 | 600 | 585 | 11 | 775 | 33 |
| 510 | 650 | 660 | 570 | 15.2 | 950 | 33.4 |
| 520 | 700 | 650 | 570 | 19 | 1000 | 33 |
| 530 | 650 | 650 | 620 | 24 | 1500 | 30 |

Example II

One eighth inch cubes of polyvinylchloride polymer of the grade commonly used for the extrusion of water pipe were fed through the equipment described in Example I. The results of this work are shown in Table 2.

TABLE 2

| Temp. of 1.940 in. dia. barrel | Temp. of 2.050 in. dia. barrel | Die Temp. °F. | Melt Temp. °F. | RPM of Screw | Pressure at die lbs/sq. in. | Grams/revolution of screw |
|---|---|---|---|---|---|---|
| 250°F. | 350°F. | 350°F. | 350°F. | 11 | 875 | 20 |
| 250 | 350 | 350 | 345 | 15.4 | 1150 | 22 |
| 250 | 375 | 375 | 340 | 19.5 | 1200 | 20 |
| 250 | 350 | 350 | 360 | 19.5 | 1700 | 20 |

From the above examples it is seen that the delivery is uniform and dependable over a wide range of screw speeds and die pressures.

The apparatus is well suited to process polymers such as polypropylene, polyethylene terephthalate, polycaprolactam and polyoxymethylene resins, to name a few.

I claim:

1. An extrusion apparatus for extruding plastic resinous material comprising:
   a. a tubular barrel member having a feed port near one end and a discharge port at the opposite end, said barrel member having an interior surface extending substantially throughout the length of the barrel between the feed port and the discharge port to define a substantially constant diameter bore therebetween, said bore being comprised of a first entrance high viscosity zone and a second lower viscosity mixing discharge zone, said first zone having longitudinal grooves along the interior surface;
   b. a two-zoned screw member rotatably mounted within the bore of said barrel, said screw member having an effective length substantially equal to that of the bore of the barrel member and having a predetermined thread, hand, land, pitch, and diameter for each of said first entrance zone of the bore and the second discharge zone of the bore; the first zone of the screw has a close fit with the interior surface of the bore of the barrel member, the pitch of the thread is substantially constant and is less than the diameter of the screw and the thread of the screw has a depth that decreases along the length of the screw to provide a compression ratio within the range of about 2 to 3.5 and; the second zone of the screw has a shaft and thread diameter that is substantially less than the diameter of the bore of the barrel, the screw in said second zone has a multiple lead thread with a pitch at least two times the diameter of the bore to provide substantial blowback for mixing and discharge of resinous material;
   c. rotating means operatively associated with the screw member for rotating the screw member;
   d. heating means operatively associated with the barrel member to maintain temperature of the resinous material within the bore at predetermined temperatures; and
   e. an extrusion die operatively associated with the discharge port of the tubular barrel member.

2. The apparatus of claim 1 wherein the first zone of the bore has a length of ⅜ to ⅝ of the total length of the bore.

3. The apparatus of claim 1 wherein the longitudinal grooves in the interior surface of the first zone of the bore have a crescent-shaped cross section.

4. The apparatus of claim 3 wherein the crescent-shaped longitudinal grooves have a depth of less than about 0.2 inches.

5. The apparatus of claim 1 wherein the first zone of the bore is co-extensive with the first zone of the screw member.

6. The apparatus of claim 1 wherein the second zone of the bore member is co-extensive with the second zone of the screw member.

7. The apparatus of claim 1 wherein the pitch of the lead thread within the first zone of the screw is within the range of 0.5 to 1.0 times the diameter of the first zone of the bore.

8. The apparatus of claim 1 wherein the second zone of the screw member has a triple lead thread with a pitch at least two times that of the first zone of the screw.

9. The apparatus of claim 1 wherein the thread of the screw within the second zone has a diameter that is within the range of 0.050 inches to 0.100 inches less than the diameter of the second zone of the bore.

* * * * *